US012756802B2

(12) United States Patent
Tsukioka et al.

(10) Patent No.: US 12,756,802 B2
(45) Date of Patent: Oct. 6, 2026

(54) PROJECTOR

(71) Applicant: SEIKO EPSON CORPORATION, Tokyo (JP)

(72) Inventors: Keita Tsukioka, Matsumoto (JP); Takuo Yoneyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 308 days.

(21) Appl. No.: 18/430,865

(22) Filed: Feb. 2, 2024

(65) Prior Publication Data

US 2024/0267497 A1 Aug. 8, 2024

(30) Foreign Application Priority Data

Feb. 3, 2023 (JP) ................................ 2023-015117

(51) Int. Cl.
*H04N 9/31* (2006.01)
*G02B 5/30* (2006.01)

(52) U.S. Cl.
CPC ......... *H04N 9/3167* (2013.01); *G02B 5/3016* (2013.01); *H04N 9/3152* (2013.01)

(58) Field of Classification Search
CPC ...... G03B 21/00–64; H04N 9/31–3197; G02B 5/00–32
See application file for complete search history.

(56) References Cited

U.S. PATENT DOCUMENTS

2005/0280785 A1* 12/2005 Beeson .................. G03B 33/10 348/E9.027
2007/0206164 A1* 9/2007 Beeson .............. G03B 21/2073 353/94
2009/0116214 A1* 5/2009 Phillips, III ......... G02B 27/288 362/230

FOREIGN PATENT DOCUMENTS

JP H07-319066 A 12/1995
JP H10-274780 A 10/1998

* cited by examiner

*Primary Examiner* — Christopher A Lamb, II
(74) *Attorney, Agent, or Firm* — Oliff PLC

(57) ABSTRACT

A projector includes a polarization separator that reflects first polarized white light from a light source apparatus and transmit second polarized white light from the light source apparatus, a reflective liquid crystal panel that has first pixels that output first image light as a result of modulation of first color light contained in the first polarized white light and being the second polarized light, second pixels that output second image light as a result of modulation of second color light contained in the first polarized white light and being the second polarized light, and third pixels that output third image light as a result of modulation of third color light contained in the first polarized white light and being the second polarized light, a reflective color filter, and a projection lens that projects the first to third image light being the second polarized light.

7 Claims, 4 Drawing Sheets

PROJECTOR

The present application is based on, and claims priority from JP Application Serial Number 2023-015117, filed Feb. 3, 2023, the disclosure of which is hereby incorporated by reference herein in its entirety.

BACKGROUND

1. Technical Field

The present disclosure relates to a projector.

2. Related Art

There has been a known projector including a light source, a light modulator that modulates the light output from the light source, and a projection lens that projects the light modulated by the light modulator (see JP-A-7-319066, for example).

In the projector described in JP-A-7-319066, the light output from the light source enters a transmissive color LCD panel via a first transmissive Fresnel lens. The light modulated by the color LCD panel is guided to the projection lens via a second transmissive Fresnel lens, travels from the projection lens to a reflection mirror, enlarged by the reflection mirror, and projected onto a screen.

JP-A-7-319066 is an example of the related art.

In general, a liquid crystal panel that forms a color image has a color filter disposed therein. The color filter includes a red filter, a green filter, and a blue filter disposed in accordance with three sub-pixels provided in each of a plurality of pixels. The red filter transmits red light and absorbs the other color light. The green filter transmits green light and absorbs the other color light. The blue filter transmits blue light and absorbs the other color light.

When the intensity of the light that enters such a color filter increases, the amount of heat generated by the color filter increases, so that the heat degrades the liquid crystal panel at which the color filter is disposed.

On the other hand, providing a large cooling mechanism for cooling the liquid crystal panel causes a problem of a tendency toward a larger projector.

It has therefore been desired to provide a configuration that allows suppression of the increase in the temperature of the liquid crystal panel with the reduction in the size of the projector maintained.

SUMMARY

A projector according to an aspect of the present disclosure includes a light source apparatus that outputs light containing first polarized white light and second polarized white light, and a polarization separator that receives the white light incident from the light source apparatus, reflects the first polarized white light in a first direction, and transmits the second polarized white light in a second direction that intersects with the first direction. The projector further includes a reflective liquid crystal panel that receives first color light, second color light, and third color light contained in the first polarized white light reflected off the polarization separator and has first pixels that output first image light as a result of modulation of the first color light and being the second polarized light in an opposite direction of the first direction, second pixels that output second image light as a result of modulation of the second color light and being the second polarized light in the opposite direction of the first direction, and third pixels that output third image light as a result of modulation of the third color light and being the second polarized light in the opposite direction of the first direction. The projector further includes a reflective color filter including first filters that are provided in accordance with the first pixels, transmit the first color light, and reflect the second color light and the third color light, second filters that are provided in accordance with the second pixels, transmit the second color light, and reflect the first color light and the third color light, and third filters that are provided in accordance with the third pixels, transmit the third color light, and reflect the first color light and the second color light. The projector further includes a projection lens that projects, out of the first image light, the first image light passing through the polarization separator and being the second polarized light, projects, out of the second image light, the second image light passing through the polarization separator and being the second polarized light, and projects, out of the third image light, the third image light passing through the polarization separator and being the second polarized light.

DESCRIPTION OF EMBODIMENTS

First Embodiment

A first embodiment of the present disclosure will be described below with reference to the drawings.

Schematic Configuration of Projector

Figure 1:
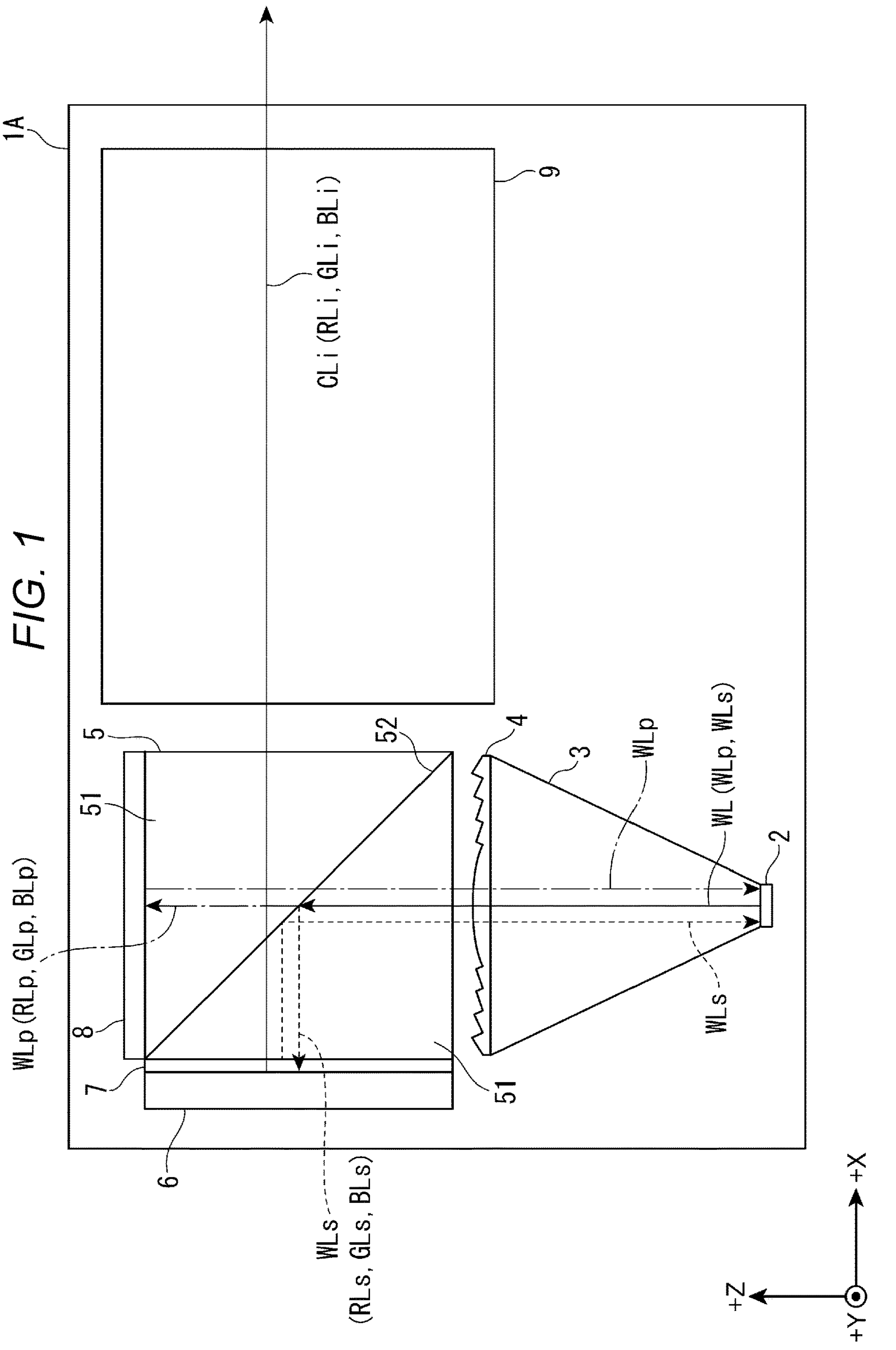
FIG. 1 is a diagrammatic view showing a schematic configuration of a projector according to a first embodiment.

FIG. 1 is a diagrammatic view showing a schematic configuration of a projector 1A according to the present embodiment.

The projector 1A according to the present embodiment is an image display apparatus that modulates light output from a light source apparatus 2 to form image light according to image information and enlarges and projects the formed image light on a projection receiving surface, such as a screen.

The projector 1A includes the light source apparatus 2, a reflector 3, a parallelizing lens 4, a polarization separator 5, a reflective liquid crystal panel 6, a reflective color filter 7, a reflection element 8, and a projection lens 9, as shown in FIG. 1. In addition to the components described above, the projector 1A includes, although not shown, a controller that controls the projector 1A, a power supply that supplies electronic parts in the projector 1A with electric power, and a cooler that cools cooling targets in the projector 1A.

In the following description, three directions perpendicular to one another are called an X-direction toward the positive end thereof, a Y-direction toward the positive end thereof, and Z-direction toward the positive end thereof. Out of the directions described above, it is assumed that the Z-direction toward the positive end thereof is the direction in which the light source apparatus 2, which will be described later, outputs light when viewed in the Y-direction toward the positive end thereof, and that the X-direction toward the positive end thereof is the direction in which the projection lens 9, which will be described later, projects the image light when viewed in the Y-direction toward the positive end thereof. Although not shown, it is assumed that the opposite direction of the X-direction toward the positive end thereof is the X-direction toward the negative end thereof, the opposite direction of the Y-direction toward the positive end thereof is the Y-direction toward the negative end thereof, and the opposite direction of the Z-direction toward the positive end thereof is the Z-direction toward the negative end thereof. It is further assumed that an axis along the X-direction toward the positive end thereof is an X-axis, the axis along the Y-direction toward the positive end thereof is a Y-axis, and the axis along the Z-direction toward the positive end thereof is a Z-axis.

The X-direction toward the negative end thereof corresponds to a first direction, and the Z-direction toward the positive end thereof corresponds to a second direction.

Schematic Configuration of Light Source Apparatus

The light source apparatus 2 outputs white light WL containing s-polarized white light WLs and p-polarized white light WLp. The white light WL is light including red light, green light, and blue light.

In the present embodiment, the s-polarized light corresponds to first polarized light and is linearly polarized light reflected off the polarization separator 5. The p-polarized light corresponds to second polarized light and is linearly polarized light passing through the polarization separator 5. The red light corresponds to first color light, the green light corresponds to second color light, and the blue light corresponds to third color light.

The configuration of the light source apparatus 2 will be described later in detail.

Configuration of Reflector

The reflector 3 is provided in the optical path between the light source apparatus 2 and the polarization separator 5. The reflector 3 is formed in a truncated conical shape or a truncated pyramidal shape having an outer diameter that increases as the reflector 3 extends in the Z-direction toward the positive end thereof. The end of the reflector 3 that faces the negative end of the Z-direction is coupled to the light source apparatus 2 to prevent light leakage, and the end of the reflector 3 that faces the positive end of the Z-direction is coupled to the parallelizing lens 4 to prevent light leakage.

The reflector 3 guides the white light WL output from the light source apparatus 2 to the parallelizing lens 4, and also scatters the white light WL at the inner surface of the reflector 3 to homogenize the illuminance of the white light WL. The reflector 3 further guides the light incident from the polarization separator 5 in the Z direction toward the negative end thereof to the light source apparatus 2 while causing the light to be scattered at the inner surface of the reflector 3. The reflector 3 is preferably formed of a rough surface to facilitate the scattering of incident light.

The reflector 3 may for example, be a hollow reflector with a space formed therein, or may be a solid reflector filled with a light transmissive material.

Configuration of Parallelizing Lens

The parallelizing lens 4 parallelizes the white light WL that is output from the light source apparatus 2 and enters the parallelizing lens 4 via the reflector 3, and causes the parallelized white light WL to enter the polarization separator 5. The parallelizing lens 4 further causes the light incident from the polarization separator 5 in the Z-direction toward the negative end thereof to converge toward the light source apparatus 2.

In the present embodiment, the parallelizing lens 4 is a Fresnel lens. Therefore, the parallelizing lens 4 can efficiently parallelize the white light WL diffusively output from the light source apparatus 2, and can also cause the light incident from the polarization separator 5 in the Z-direction toward the negative end thereof to converge toward the light source apparatus 2 over a short distance.

Note that the parallelizing lens 4 is not limited to a Fresnel lens and may be any lens capable of parallelizing the light incident from the reflector 3 and causing the light incident from the polarization separator 5 to converge toward the light source apparatus 2. The parallelizing lens 4 is not limited to a single lens and may include a plurality of lenses.

Configuration of Polarization Separator

The polarization separator 5 is disposed in a position shifted from the light source apparatus 2 in the Z-direction toward the positive end thereof. The polarization separator 5 is a prism-shaped polarization separator including two light transmissive members 51 each having a substantially right-angled isosceles triangular columnar shape and a polarization separation layer 52 provided between the two light transmissive members 51.

The two light transmissive members 51 are each a light transmissive prism element, and are primarily made of a glass material.

The polarization separation layer 52 inclines by 45° with respect to the X-direction and the Z-direction toward the positive ends thereof. In detail, the polarization separation layer 52 inclines by 45° with respect to the XY-plane and the YZ-plane. The polarization separation layer 52 has a polarization separation characteristic that causes the polarization separation layer 52 to reflect s-polarized light and transmit p-polarized light. Therefore, for example, out of the white light WL output from the light source apparatus 2 and incident on the polarization separation layer 52 in the Z-direction toward the positive end thereof, the s-polarized white light WLs is reflected off the polarization separator 5 in the X-direction toward the negative end thereof, and the p-polarized white light WLp passes through the polarization separator 5 in the Z-direction toward the positive end thereof.

Note that the polarization separator 5 is not limited to a prism-shaped polarization separator, and may be a plate-shaped polarization separator.

Arrangement of Reflective Liquid Crystal Panel and Reflective Color Filter

The reflective liquid crystal panel 6 and the reflective color filter 7 are disposed at positions shifted from the polarization separator 5 in the X-direction toward the negative end thereof. That is, the reflective liquid crystal panel 6 and the reflective color filter 7 are disposed at positions shifted from the polarization separator 5 in the direction in which the s-polarized white light WLs out of the white light WL incident from the light source apparatus 2 exits out of the polarization separator 5.

Configuration of Reflective Liquid Crystal Panel

Figure 2:
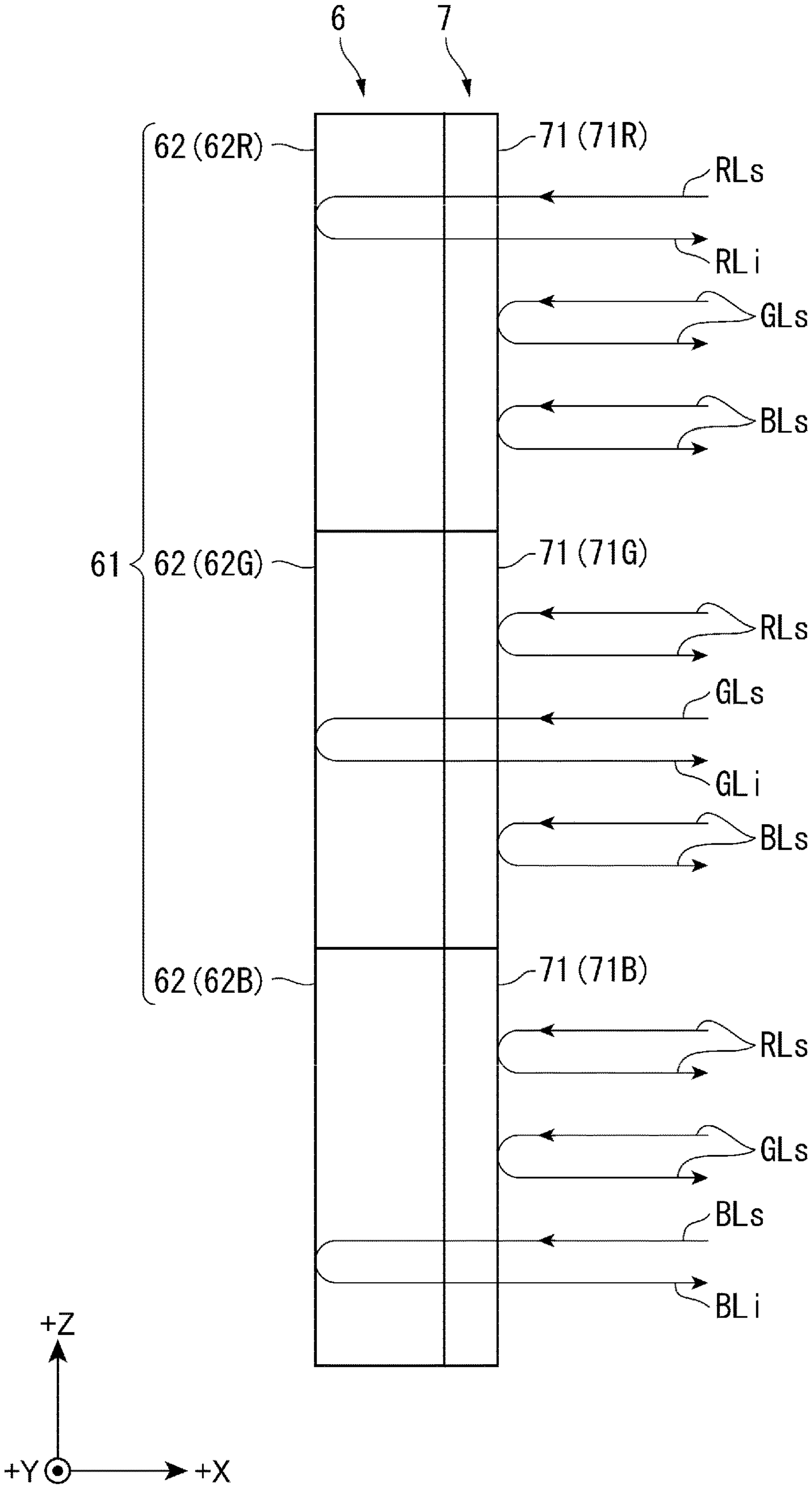
FIG. 2 is a diagrammatic view showing schematic configurations of reflective color filter and a reflective color liquid crystal panel according to the first embodiment.

FIG. 2 is a diagrammatic view showing the reflective liquid crystal panel 6 and the reflective color filter 7. FIG. 2 shows one of a plurality of pixels 61 provided in the reflective liquid crystal panel 6, and further shows one red filter 71R, one green filter 71G, and one blue filter 71B of a plurality of filters 71 provided in the reflective color filter 7.

The reflective liquid crystal panel 6 modulates the light incident from the polarization separator 5 via the reflective color filter 7 and outputs the resultant image light in the opposite direction of the direction in which the light from the polarization separator 5 is incident. The reflective liquid crystal panel 6 has the plurality of pixels 61, which modulate the light incident thereon, as shown in FIG. 2. The plurality of pixels 61 each include a plurality of sub-pixels 62 each including a liquid crystal layer.

S-polarized color light having passed through the reflective color filter 7 is incident on the sub-pixels 62, and the sub-pixels 62 modulates the incident color light. The polarization direction of the color light is rotated when the color light is reflected off a reflective layer that is not shown and makes a round trip through the liquid crystal layer of each of the sub-pixels 62 to which a voltage is applied. The angle of rotation of the polarization direction of the color light rotated by the sub-pixels 62 changes in accordance with the voltage applied to the sub-pixels 62.

For example, when the voltage applied to the sub-pixels 62 has a maximum value, the s-polarized color light having entered the sub-pixels 62 is converted into p-polarized color light, which then exits out of the sub-pixels 62. For example, when the voltage applied to the sub-pixels 62 has a minimum value, the polarization direction of the s-polarized color light having entered the sub-pixels 62 is not rotated but the s-polarized color light exits in the form of s-polarized light out of the sub-pixels 62. For example, when the voltage applied to the sub-pixels 62 has an intermediate value between the maximum and minimum values, the polarization direction of the s-polarized color light having entered the sub-pixels 62 is so rotated by an intermediate angle that the changed polarization direction is between the polarization direction of the s-polarized light and the polarization direction of the p-polarized light, and the resultant s-polarized light exits out of the sub-pixels 62. The grayscale of a projection image passing through the polarization separator 5 and projected by the projection lens 9 is thus adjusted.

The plurality of sub-pixels 62 each include a red sub-pixel 62R, a green sub-pixel 62G, and a blue sub-pixel 62B.

The red sub-pixel 62R corresponds to a first pixel, modulates s-polarized red light RLs traveling from the polarization separator 5 and passing through the red filter 71R in the X-direction toward the negative end thereof, and outputs modulated red image light RLi in the X-direction toward the positive end thereof. The red image light RLi corresponds to first image light.

The green sub-pixel 62G corresponds to a second pixel, modulates s-polarized green light GLs traveling from the polarization separator 5 and passing through the green filter 71G in the X-direction toward the negative end thereof, and outputs modulated green image light GLi in the X-direction toward the positive end thereof. The green image light GLi corresponds to second image light.

The blue sub-pixel 62B corresponds to a third pixel, modulates s-polarized blue light BLs traveling from the polarization separator 5 and passing through the blue filter 71B in the X-direction toward the negative end thereof, and outputs modulated blue image light BLi in the X-direction toward the positive end thereof. The blue image light BLi corresponds to third image light.

Configuration of Reflective Color Filter

The reflective color filter 7 is disposed between the polarization separator 5 and the reflective liquid crystal panel 6. The s-polarized white light WLs enters the reflective color filter 7 from the polarization separator 5 along the X-direction toward the negative end thereof, and the image light RLi, the image light GLi, and the image light BLi further enter the reflective color filter 7 from the reflective liquid crystal panel 6 along the X-direction toward the positive end thereof.

The reflective color filter 7 is a wavelength selective filter including the plurality of filters 71 provided in accordance with the plurality of sub-pixels 62 of each of the pixels 61 of the reflective liquid crystal panel 6, as shown in FIG. 2. The plurality of filters 71 each include the red filter 71R, the green filter 71G, and the blue filter 71B.

The red filter 71R corresponds to a first filter and is provided in accordance with each of the red sub-pixels 62R. The red filter 71R is provided at a position shifted from the red sub-pixel 62R in the X-direction toward the positive end thereof, which is the side at which the red light RLs is incident.

The red filter 71R transmits the red light RLs and reflects the green light GLs and the blue light BLs without substantially rotating the polarization directions thereof.

The red filter 71R thus transmits in the X-direction toward the negative end thereof the red light RLs incident from the polarization separator 5 in the X-direction toward the negative end thereof and causes the red light RLs to enter the red sub-pixel 62R. The red filter 71R transmits the red image light RLi incident from the red sub-pixel 62R in the X-direction toward the positive end thereof without rotating the polarization direction of the red image light RLi and causes the red image light RLi to enter the polarization separator 5.

The green filter 71G corresponds to a second filter and is provided in accordance with each of the green sub-pixels 62G. The green filter 71G is provided at a position shifted from the green sub-pixel 62G in the X-direction toward the positive end thereof, which is the side at which the green light GLs is incident.

The green filter 71G transmits the green light GLs and reflects the red light RLs and the blue light BLs without substantially rotating the polarization directions thereof.

The green filter 71G thus transmits in the X-direction toward the negative end thereof the green light GLs incident from the polarization separator 5 in the X-direction toward the negative end thereof and causes the green light GLs to enter the green sub-pixel 62G. The green filter 71G transmits the green image light GLi incident from the green sub-pixel 62G in the X-direction toward the positive end thereof without rotating the polarization direction of the green image light GLi and causes the green image light GLi to enter the polarization separator 5.

The blue filter 71B corresponds to a third filter and is provided in accordance with each of the blue sub-pixels 62B. The blue filter 71B is provided at a position shifted from the blue sub-pixel 62B in the X-direction toward the positive end thereof, which is the side at which the blue light BLs is incident.

The blue filter 71B transmits the blue light BLs and reflects the red light RLs and the green light GLs without substantially rotating the polarization directions thereof.

The blue filter 71B thus transmits in the X-direction toward the negative end thereof the blue light BLs incident from the polarization separator 5 in the X-direction toward the negative end thereof and causes the blue light BLs to enter the blue sub-pixel 62B. The blue filter 71B transmits the blue image light BLi incident from the blue sub-pixel 62B in the X-direction toward the positive end thereof without rotating the polarization direction of the blue image light BLi and causes the blue image light BLi to enter the polarization separator 5.

Out of the image light RLi, the image light GLi, and the image light BLi having entered the polarization separator 5, the p-polarized image light RLi, image light GLi, and image light BLi pass through the polarization separator 5 in the X-direction toward the positive end thereof and enter the projection lens 9. Note that out of the image light RLi, the image light GLi, and the image light BLi having entered the polarization separator 5, the s-polarized image light RLi, image light GLi, and image light BLi are reflected off the polarization separator 5 in the Z-direction toward the negative end thereof.

Configurations of Reflection Element and Projection Lens

The reflection element 8 is disposed in a position shifted from the polarization separator 5 in the Z-direction toward the positive end thereof. In detail, the reflection element 8 is provided at the surface of the prism-shaped polarization separator 5 that faces the positive end of the Z-direction. The reflection element 8 is a total reflection mirror that reflects light incident thereon. The p-polarized white light WLp having passed through the polarization separator 5 in the Z-direction toward the positive end thereof is reflected off the reflection element 8 in the Z-direction toward the negative end thereof with the polarization direction of the p-polarized white light WLp substantially not rotated, and enters the polarization separator 5.

The projection lens 9 projects light that enters the projection lens 9 onto the projection receiving surface. That is, the projection lens 9 projects color image light CLi formed by the p-polarized image light RLi, image light GLi, and image light BLi having passed through the polarization separator 5 in the X-direction toward the positive end thereof. The projection lens 9 can, for example, be an assembled lens including a plurality of lenses and a lens barrel that accommodates the plurality of lenses.

Detailed Configuration of Light Source Apparatus

Figure 3:
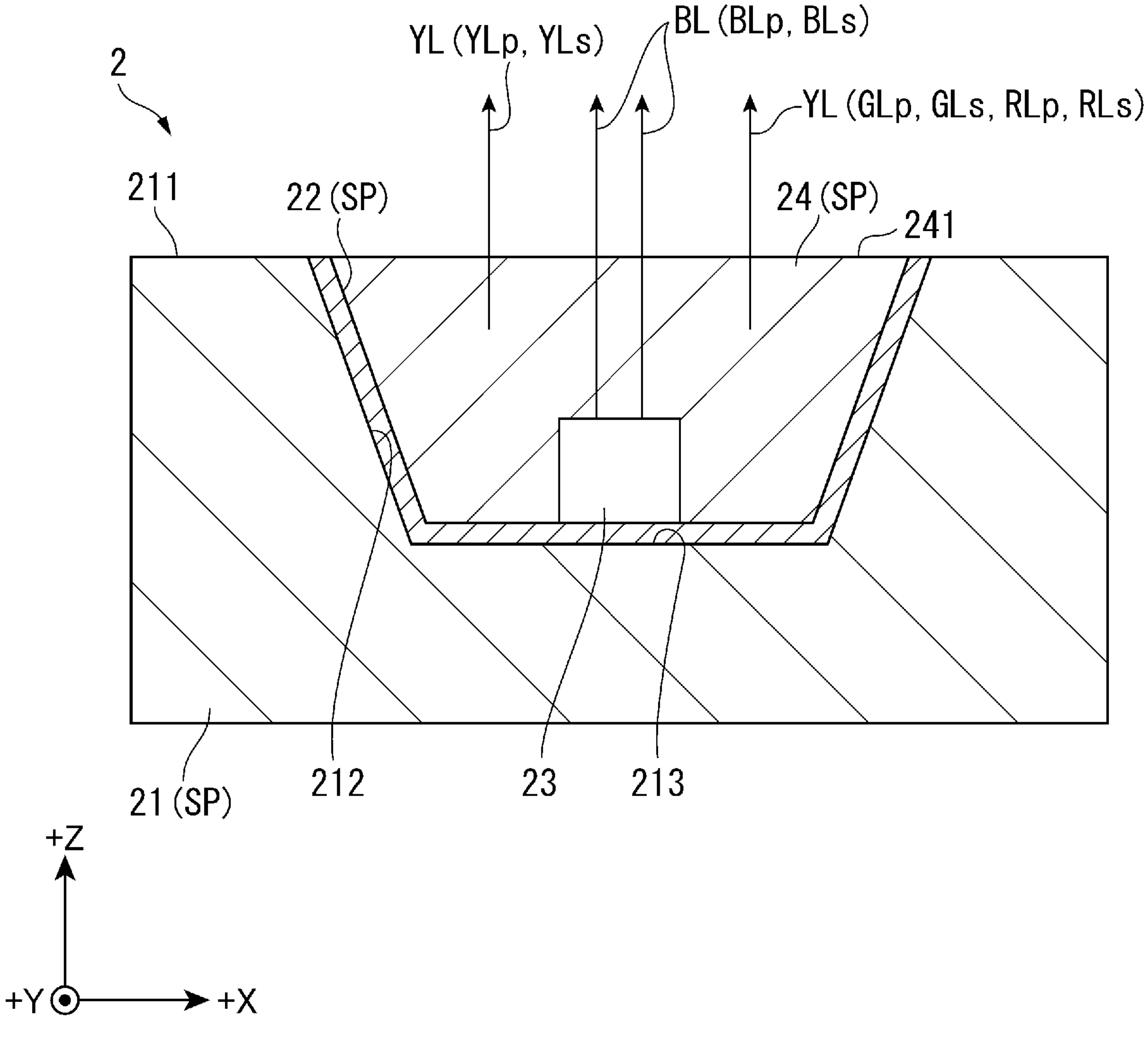
FIG. 3 is a diagrammatic view showing a schematic configuration of a light source apparatus according to the first embodiment.

FIG. 3 is a diagrammatic view showing the configuration of the light source apparatus 2.

The light source apparatus 2 includes a base member 21, a reflection layer 22, a solid-state light emitter 23, and a phosphor layer 24, as shown in FIG. 3. The base member 21, the reflection layer 22, and the phosphor layer 24 constitute a scattering section SP in the present disclosure.

The base member 21 is made, for example, of metal that can reflect light, and supports the reflection layer 22, the solid-state light emitter 23, and the phosphor layer 24. The base member 21 has a first surface 211 and a recess 212.

The first surface 211 is the surface of the base member 21 via which the light source apparatus 2 outputs the white light WL. That is, the first surface 211 faces the positive end of the Z-direction.

The recess 212 is provided at the first surface 211, is recessed in the Z-direction toward the negative end thereof, and has a truncated conical shape or a truncated pyramidal shape. The recess 212 is so formed that the inner diameter thereof decreases as the recess 212 extends from the first surface 211 toward a bottom 213 of the recess 212.

Note that the base member 21 having the recess 212 may be replaced with a support member including a substrate having the shape of a planar plate and a cover member that is provided around the substrate and covers the solid-state light emitter 23 and the side surfaces of the phosphor layer 24.

The reflection layer 22 is provided at the inner surface of the recess 212 and reflects light incident thereon. Specifically, the reflection layer 22 is provided between the inner surface of the recess 212 and the combination of the solid-state light emitter 23 and the phosphor layer 24, and reflects light incident from the solid-state light emitter 23 and the phosphor layer 24. The reflection layer 22 is preferably formed of a layer including a rough surface or containing scattering particles to facilitate the scattering of light incident thereon. Note that when the inner surface of the recess 212 has sufficient light reflection characteristics, the reflection layer 22 may be omitted. In this case, it is preferable that the recess has a rough surface.

Since the recess 212 provided with the thus configured reflection layer 22 reflects the light incident thereon toward the exterior of the light source apparatus 2, it can also be said that the recess 212 is another reflector in addition to the reflector 3.

The solid-state light emitter 23 is disposed at the bottom 213 of the recess 212. The solid-state light emitter 23 emits blue light BL, which is excitation light. The blue light BL emitted from the solid-state light emitter 23 is unpolarized blue light, and contains the s-polarized blue light BLs and p-polarized blue light BLp. An example of the solid-state light emitter 23 is an LED (light emitting diode) that emits blue light having a peak wavelength of 440 nm.

The phosphor layer 24 contains a phosphor that is excited by the blue light BL and emits non-polarized fluorescence YL in the form of scattered light. That is, the phosphor layer 24 is a wavelength conversion layer that converts the incident blue light BL into the non-polarized fluorescence YL having a wavelength longer than the wavelength of the blue light BL. The fluorescence YL contains p-polarized fluorescence YLp and s-polarized fluorescence YLs. In detail, the fluorescence YL includes red light and green light, the red light includes the s-polarized red light RLs and p-polarized red light RLp, and the green light includes the s-polarized green light GLs and p-polarized green light GLp.

The fluorescence YL converted from the blue light BL in the phosphor layer 24 exits via a surface 241 of the phosphor layer 24 in the form of scattered light along with the blue light BL that has not been converted into the fluorescence YL, and then exits out of light the source apparatus 2 as the white light WL containing the s-polarized white light WLs and the p-polarized white light WLp.

Since the solid-state light emitter 23 and the phosphor layer 24 thus output the white light WL, it can also be said that the light source apparatus 2 include a white LED formed of the solid-state light emitter 23 and the phosphor layer 24.

Optical Path of Light Output from Light Source Apparatus

The light source apparatus 2 outputs the white light WL containing the s-polarized white light WLs and the p-polarized white light WLp in the Z-direction toward the positive end thereof. The white light WL enters the polarization separator 5 in the Z direction toward the positive end thereof via the reflector 3 and the parallelizing lens 4.

Out of the white light WL having entered the polarization separator 5, the s-polarized white light WLs is reflected off the polarization separator 5 in the X-direction toward the negative end thereof. That is, the red light RLs, the green light GLs, and the blue light BLs, which constitute the white light WLs having entered the polarization separator 5, are reflected off the polarization separator 5 in the X-direction toward the negative end thereof.

The red light RLs, the green light GLs, and the blue light BLs reflected off the polarization separator 5 in the X-direction toward the negative end thereof enter the reflective color filter 7, as shown in FIG. 2.

In this process, out of the red light RLs, the green light GLs, and the blue light BLs having entered the red filters 71R, the red light RLs passes through the red filters 71R and enters the red sub-pixels 62R, but the green light GLs and the blue light BLs are reflected off the red filters 71R in the X-direction toward the positive end thereof.

Out of the red light RLs, the green light GLs, and the blue light BLs having entered the green filters 71G, the green light GLs passes through the green filters 71G and enters the green sub-pixels 62G, but the red light RLs and the blue light BLs are reflected off the green filters 71G in the X-direction toward the positive end thereof.

Out of the red light RLs, the green light GLs, and the blue light BLs having entered the blue filters 71B, the blue light BLs passes through the blue filters 71B and enters the blue sub-pixels 62B, but the red light RLs and the green light GLs are reflected off the blue filters 71B in the X-direction toward the positive end thereof.

The sub-pixels 62R, 62G, and 62B each modulate incident color light and output the resultant red image light RLi, green image light GLi, and blue image light BLi in the X-direction toward the positive end thereof. The image light RLi, the image light GLi, and the image light BLi pass through the corresponding filters 71 and enter the polarization separator 5 in the Z direction toward the positive end thereof.

Out of the image light RLi, the image light GLi, and the image light BLi having entered the polarization separator 5 in the X-direction toward the positive end thereof, the image light RLi, the image light GLi, and the image light BLi having the polarization direction that allows the image light to pass through the polarization separator 5 pass through the polarization separator 5 and enter the projection lens 9. The projection lens 9 projects the incident image light RLi, GLi, and BLi. Images based on the image light RLi, the image light GLi, and the image light BLi are displayed at the projection receiving surface.

Out of the image light RLi, the image light GLi, and the image light BLi having entered the polarization separator 5 in the X-direction toward the positive end thereof, the color light having the polarization direction that does not allow the color light to pass through the polarization separator 5 is reflected off the polarization separator 5 in the Z-direction toward the negative end thereof and enters the light source apparatus 2 via the parallelizing lens 4 and the reflector 3.

The red light RLs, the green light GLs, and the blue light BLs having been reflected off the reflective color filter 7 and having entered the polarization separator 5 in the X direction toward the positive end thereof are also reflected off the polarization separator 5 in the Z-direction toward the negative end thereof and enter the light source apparatus 2 via the parallelizing lens 4 and the reflector 3.

Out of the white light WL having entered the polarization separator 5 in the Z-direction toward the positive end thereof, the p-polarized white light WLp passes through the polarization separator 5 in the Z-direction toward the positive end thereof and is incident on the reflection element 8.

The white light WLp incident on the reflection element 8 is reflected off the reflection element 8 with the polarization direction of the white light WLp substantially not rotated, passes through the polarization separator 5 in the Z-direction toward the negative end thereof, and enters the light source apparatus 2 via the parallelizing lens 4 and the reflector 3.

As described above, the three types of polarized light enter the light source apparatus 2 as return light, the p-polarized white light WLp having passed through the polarization separator 5 in the Z-direction toward the positive end thereof, having been reflected off the reflection element 8, and having passed through the polarization separator 5 in the Z-direction toward the negative end thereof, the s-polarized white light WLs having been reflected off the polarization separator 5 in the X-direction toward the negative end thereof, having been reflected off the reflective color filter 7, and having been reflected off the polarization separator 5 in the Z-direction toward the negative end thereof, and the s-polarized light having been reflected off the polarization separator 5 in the X-direction toward the negative end thereof, having passed through the reflective color filter 7, having been reflected off the reflective liquid crystal panel 6, and having been reflected off the polarization separator 5 in the Z-direction toward the negative end thereof.

The s-polarized light having been reflected off the polarization separator 5 in the X-direction toward the negative end thereof, having passed through the reflective color filter 7, having been reflected off the reflective liquid crystal panel 6, and having been reflected off the polarization separator 5 in the Z-direction toward the negative end thereof is also color light which have not modulated as image light by the reflective liquid crystal panel 6.

Part of the return light is incident on the first surface 211 of the base member 21 shown in FIG. 3 and is reflected off the first surface 211 in the Z-direction toward the positive end thereof.

Another part of the return light is reflected off the surface 241 of the phosphor layer 24, which is provided in the recess 212 provided via the first surface 211, in the Z-direction toward the positive end thereof.

The remainder of the return light enters the interior of the phosphor layer 24. The light that enters the interior of the phosphor layer 24 has been scattered at the entrance to the phosphor layer 24.

Part of the light having entered the interior of the phosphor layer 24 propagates in the phosphor layer 24, is then reflected off the reflection layer 22, and repeatedly internally reflected in the recess 212 or otherwise processed, so that the polarization direction of the light is rotated, and the resultant light exits out of the phosphor layer 24 in the Z-direction toward the positive end thereof.

Part of the blue light BL out of the light having entered the interior of the phosphor layer 24 excites the phosphor contained in the phosphor layer 24, and is converted by the phosphor into the unpolarized fluorescence light YL. The fluorescence YL emitted from the phosphor becomes scattered light radially emitted from the phosphor. Part of the fluorescence YL propagates from the phosphor through the phosphor layer 24 and exits out of the phosphor layer 24 in the Z-direction toward the positive end thereof. Another part of the fluorescence YL propagates through the phosphor layer 24, is reflected off the reflection layer 22, and exits out of the phosphor layer 24 in the Z-direction toward the positive end thereof. On the other hand, the red light and the green light, even when they enter the phosphor, do not excite the phosphor but are scattered by the phosphor. That is, the phosphor is a scattering element that scatters light incident thereon.

The longer the distance over which the light propagates through the phosphor layer 24, the more likely the polarization state of the light is disrupted and the more likely the light becomes unpolarized when the light exits out of the phosphor layer 24.

The light reflected off the first surface 211 and the surface 241 of the phosphor layer 24 in the Z direction toward the positive end thereof and the light emitted from the phosphor layer 24 in the Z direction toward the positive end thereof exit out of the light source apparatus 2 as part of the white light WL containing the s-polarized white light WLs and the p-polarized white light WLp, and enters the polarization separator 5 again via the reflector 3 and parallelizing lens 4. The reflector 3 functions to help scatter the light incident thereon to produce unpolarized white light.

The red light RLs, the green light GLs, and the blue light BLs having entered the polarization separator 5 are reflected in the X-direction toward the positive end thereof, and the red light RLs, the green light GLs, and the blue light BLs having passed through the filters 71R, 71G, and 71B of the reflective color filter 7 are used by the reflective liquid crystal panel 6 to form an image.

On the other hand, out of the white light WLp containing the red light RLp, the green light GLp, and the blue light BLp having entered the polarization separator 5 and the white light WLs reflected off the polarization separator 5 in the X-direction toward the negative end thereof, the light that has not been used by the reflective liquid crystal panel 6 to form an image enters the light source apparatus 2 again from the polarization separator 5.

The light then makes a round trip through the space between the light source apparatus 2 and the combination of the reflective liquid crystal panel 6, the reflective color filter 7, and the reflection element 8 so that the polarization direction of the light is rotated, and the resultant s-polarized light is reflected off the polarization separator 5 in the X-direction toward the negative end thereof, and used by the reflective liquid crystal panel 6 to form an image.

Effects of First Embodiment

The projector 1A according to the first embodiment described above provides the effects below.

The projector 1A includes the light source apparatus 2, the polarization separator 5, the reflective liquid crystal panel 6, the reflective color filter 7, and the projection lens 9.

The light source apparatus 2 outputs the white light WL containing the s-polarized white light WLs and the p-polarized white light WLp. The s-polarized light corresponds to the first polarized light, and the p-polarized light corresponds to the second polarized light.

The polarization separator 5 reflects the s-polarized white light WLs incident from the light source apparatus 2 in the X-direction toward the negative end thereof, and transmits the p-polarized white light WLp incident from the light source apparatus 2 in the Z-direction toward the positive end thereof. The X-direction toward the negative end thereof corresponds to the first direction, and the Z-direction toward the positive end thereof corresponds to the second direction, which intersects with the first direction.

The reflective liquid crystal panel 6 modulates the s-polarized white light WLs reflected off the polarization separator 5 and outputs the modulated white light as image light. The reflective liquid crystal panel 6 includes the red sub-pixels 62R, the green sub-pixels 62G, and the blue sub-pixels 62B. The red sub-pixels 62R, the green sub-pixels 62G, and the blue sub-pixels 62B correspond to the first pixels, the second pixels, and the third pixels, respectively.

The red sub-pixels 62R output the red image light RLi, which is the result of modulation of the s-polarized red light RLs contained in the white light WLs, in the X-direction toward the positive end thereof.

The green sub-pixels 62G output the green image light GLi, which is the result of modulation of the s-polarized green light GLs contained in the white light WLs, in the X-direction toward the positive end thereof.

The blue sub-pixels 62B output the blue image light BLi, which is the result of modulation of the s-polarized blue light BLs contained in the white light WLs, in the X-direction toward the positive end thereof.

The reflective color filter 7 includes the red filters 71R, the green filters 71G, and the blue filters 71B. The red filters 71R, the green filters 71G, and the blue filters 71B correspond to the first filters, the second filters, and the third filters, respectively.

The red filters 71R are provided in accordance with the red sub-pixels 62R, transmit the red light RLs, and reflect the green light GLs and the blue light BLs.

The green filters 71G are provided in accordance with the green sub-pixels 62G, transmit the green light GLs, and reflect the red light RLs and the blue light BLs.

The blue filters 71B are provided in accordance with the blue sub-pixels 62B, transmit the blue light BLs, and reflect the red light RLs and the green light GLs.

The projection lens 9 projects the p-polarized red image light RLi having passed through the polarization separator 5 out of the red image light RLi, the p-polarized green image light GLi having passed through the polarization separator 5 out of the green image light GLi, and the p-polarized blue image light BLi having passed through the polarization separator 5 out of the blue image light BLi.

According to the configuration described above, out of the white light WL output from the light source apparatus 2, the s-polarized white light WLs is reflected off the polarization separator 5 in the X-direction toward the negative end thereof and enters the reflective color filter 7.

Out of the s-polarized white light WLs having entered the reflective color filter 7, the red light RLs having passed through the red filters 71R is incident on the red sub-pixels 62R, the green light GLs having passed through the green filters 71G is incident on the green sub-pixels 62G, and the blue light BLs having passed through the blue filters 71B is incident on the blue sub-pixels 62B. The image light RLi, the image light GLi, and the image light BLi, which are color light modulated by the sub-pixels 62R, 62G, and 62B of the reflective liquid crystal panel 6, pass through the corresponding filters 71R, 71G, and 71B, further pass through the polarization separator 5, and are projected by the projection lens 9.

In this process, the color light excluding the red light RLs having entered the red filters 71R is reflected off the red filters 71R, the color light excluding the green light GLs having entered the green filters 71G is reflected off the green filters 71G, and the color light excluding the blue light BLs having entered the blue filters 71B is reflected off the blue filters 71B. The filters 71R, 71G, and 71B, which do not absorb light as described above, can suppress heat generated by the reflective color filter 7. Since transfer of the heat from the reflective color filter 7 to the reflective liquid crystal panel 6 can thus be suppressed, deterioration of the reflective liquid crystal panel 6 can be suppressed, and a compact cooling mechanism can be employed as a cooling mechanism that cools the reflective color filter 7 and the reflective liquid crystal panel 6.

In addition to the above, the polarization separator 5 can be used as an optical element that selects the image light RLi, GLi, and BLi modulated by the reflective liquid crystal panel 6 and causes the selected image light to enter the projection lens 9, so that there is no need to provide a polarizing plate between the reflective liquid crystal panel 6 and the polarization separator 5. The optical path between the reflective liquid crystal panel 6 and the projection lens 9 can thus be shortened, so that the size of the projector 1A can be reduced.

Thermal effects on the reflective liquid crystal panel 6 can therefore be suppressed with the reduction in the size of the projector 1A maintained.

The polarization separator 5 reflects the s-polarized white light WLs reflected off the filters 71R, 71G, and 71B in the Z-direction toward the negative end thereof and entering the polarization separator 5 in the X-direction toward the positive end thereof. The light source apparatus 2 includes the scattering section SP, which scatters and outputs the s-polarized white light WLs incident from the polarization separator 5.

According to the configuration described above, the scattering section SP scatters and outputs the s-polarized color light reflected off the filters 71R, 71G, and 71B and the polarization separator 5, and therefore allows the s-polarized white light WLs to enter the filters 71R, 71G, and 71B. The color light reflected off each of the filters 71R, 71G, and 71B of the reflective color filter 7 can therefore be incident on the other filters and then incident on the sub-pixels 62R, 62G, and 62B of the reflective liquid crystal panel 6. The amount of light used by the reflective liquid crystal panel 6 to form the image light RLi, GLi, and BLi can therefore be increased, so that the brightness of an image to be projected can be increased.

The projector 1A includes the reflection element 8, which reflects in the Z-direction toward the negative end thereof the p-polarized white light WLp having passed through the polarization separator 5 in the Z-direction toward the positive end thereof. The scattering section SP scatters the p-polarized white light WLp incident thereon after passing through the polarization separator 5 in the Z-direction toward the negative end thereof, and outputs the s-polarized white light WLs and the p-polarized white light WLp.

The configuration described above allows the p-polarized white light WLp having been output from the light source apparatus 2 and having passed through the polarization separator 5 to return to the light source apparatus 2. Part of the p-polarized white light WLp having entered the light source apparatus 2 is scattered by and repeatedly reflected off or otherwise affected by the scattering section SP, and the polarization direction of the p-polarized white light WLp is therefore so rotated that the p-polarized white light WLp is converted into the s-polarized white light WLs.

The p-polarized white light WLp having passed through the polarization separator 5 can therefore be recycled and enter the reflective color filter 7. The amount of light used by the reflective liquid crystal panel 6 to form the image light RLi, GLi, and BLi can therefore be increased, so that the brightness of an image to be projected can be increased.

The projector 1A includes the reflector 3, which is disposed in the optical path between the light source apparatus 2 and the polarization separator 5 and reflects light that enters the reflector 3.

According to the configuration described above, the light diffusively output from the light source apparatus 2 can be reflected off the reflector 3 and guided to the polarization separator 5, so that light loss can be suppressed.

The reflector 3 scatters the light that enters the reflector 3 and outputs s-polarized light and p-polarized light.

According to the configuration described above, the p-polarized white light WLp having passed through the polarization separator 5 and enters the light source apparatus 2 is scattered by the reflector 3, so that the polarization direction of the p-polarized white light WLp is rotated, and the p-polarized white light WLp is hence converted into the s-polarized white light WLs. The p-polarized white light WLp output from the light source apparatus 2 can therefore be recycled and converted into the s-polarized white light WLs, which can then enter the reflective color filter 7. The amount of light used by the reflective liquid crystal panel 6 to form the image light RLi, GLi, and BLi can therefore be increased, so that the brightness of an image to be projected can be increased.

The projector 1A includes the parallelizing lens 4, which is disposed in the optical path between the light source apparatus 2 and the polarization separator 5 and parallelizes the light output from the light source apparatus 2.

The parallelizing lens 4 is a Fresnel lens.

The configuration described above can shorten the optical path length between the light source apparatus 2 and the polarization separator 5 while parallelizing the white light WL that enters the polarization separator 5 from the light source apparatus 2. The size of the projector 1A can therefore be reduced. In addition to the above, the weight of the parallelizing lens 4 can be reduced as compared with a case where a plurality of lenses are employed as the parallelizing lens 4.

Second Embodiment

A second embodiment of the present disclosure will next be described.

A projector according to the present embodiment has the same configuration as that of the projector 1A according to the first embodiment, but differs therefrom in that a polarizer is further provided between the polarization separator 5 and the projection lens 9. In the following description, portions that are the same or substantially the same as the portions having been already described have the same reference characters and will not be described.

Schematic Configuration of Projector

Figure 4:
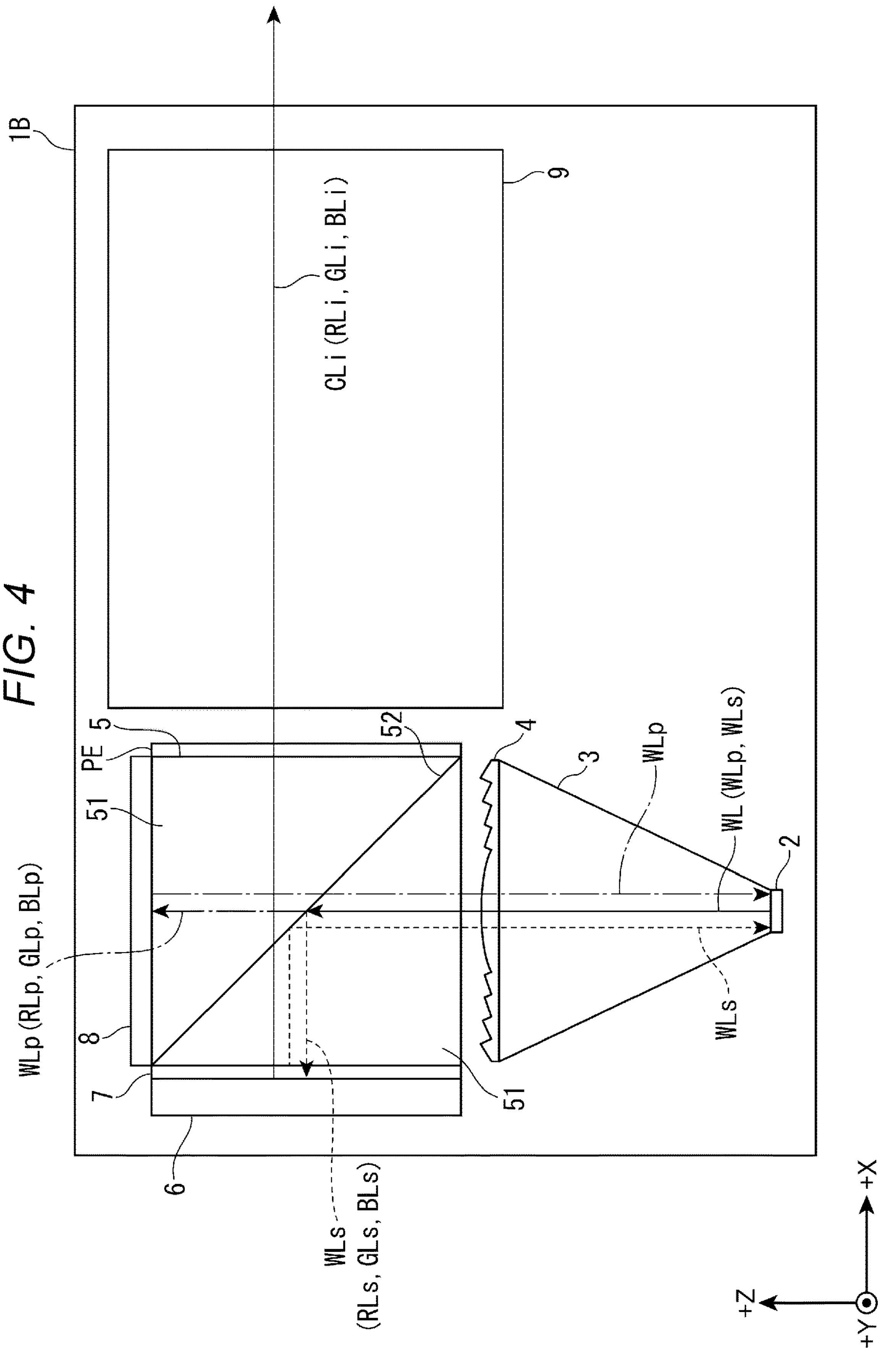
FIG. 4 is a diagrammatic view showing a schematic configuration of a projector according to a second embodiment.

FIG. 4 is a diagrammatic view showing a schematic configuration of a projector 1B according to the present embodiment.

The projector 1B according to the present embodiment has the same configuration and functions as those of the projector 1A according to the first embodiment except that the projector 1B further includes a polarizer PE.

The polarizer PE is disposed in the optical path between the polarization separator 5 and the projection lens 9 along the X-axis. In detail, the polarizer PE is attached to the surface of the prism-shaped polarization separator 5 that faces the positive end of the X-direction. That is, the polarizer PE is provided at the surface of the polarization separator 5 through which the image light RLi, the image light GLi, and the image light BLi having passed through the polarization separation layer 52 exit.

The polarizer PE transmits p-polarized light and blocks s-polarized light out of the light incident thereon. Specifically, the polarizer PE is a polarizing plate that transmits incident p-polarized light and absorbs incident s-polarized light. Note that the polarizer PE may instead transmit p-polarized light and reflect s-polarized light.

The glass material of which the light transmissive members 51 of the polarization separator 5 is made is in some cases distorted when manufactured, or may be distorted in other cases due to heat according to the intensity of the incident light. Such distortion produces a phase difference, and part of the p-polarized light passing through the light transmissive members 51 is converted into s-polarized light, and part of the s-polarized light passing through the light transmissive members 51 is converted into p-polarized light.

For example, when part of the p-polarized white light WLp reflected off the reflection element 8 is converted into s-polarized white light WLs due to the distortion of the light transmissive members 51, the converted s-polarized white light WLs is reflected off the polarization separation layer 52 in the X-direction toward the positive end thereof and enters the projection lens 9, resulting in a decrease in the contrast of an image to be projected. When part of the s-polarized color light RLs, GLs, and BLs reflected off the reflective color filter 7 is converted into p-polarized light due to the distortion of the light transmissive members 51, the converted p-polarized color light passes through the polarization separation layer 52 in the X-direction toward the positive end thereof and enters the projection lens 9.

On the other hand, when part of the p-polarized image light output from the reflective liquid crystal panel 6 is converted into s-polarized image light due to the distortion of the light transmissive members 51, the converted s-polarized image light is reflected off the polarization separation layer 52 in the Z-direction toward the negative end thereof and enters the light source apparatus 2. Such image light becomes stray light and does not enter the projection lens 9, reducing the amount of image light that enters the projection lens 9, resulting in reduction in the contrast of an image to be projected.

In contrast, in the projector 1B according to the present embodiment, the polarizer PE described above is disposed at the light exiting surface of the light transmissive member 51 shifted from the polarization separation layer 52 toward the projection lens 9, which is the surface facing the projection lens 9. The s-polarized light is thus blocked by the polarizer PE, so that even when the light transmissive members 51 are distorted, entrance of the s-polarized light into the projection lens 9 is suppressed, and the p-polarized image light enters the projection lens 9. The decrease in the contrast of an image projected by the projection lens 9 is thus suppressed.

Note that the polarizer PE may be separate from the polarization separator 5. In this case, even when the polarizer PE absorbs the s-polarized light and generates heat, transmission of the heat of the polarizer PE to the polarization separator 5 can be suppressed, so that the occurrence of the distortion described above, for example, can be suppressed. On the other hand, when the polarizer PE is attached to the polarization separator 5, there is no need for a member that fixes the polarizer PE, so that the configuration of the projector 1B can be simplified.

Effects of Second Embodiment

The projector 1B according to the present embodiment described above provides the effects below as well as the same effects as those provided by the projector 1A according to the first embodiment.

The projector 1B includes the polarizer PE, which is disposed in the optical path between the polarization separator 5 and the projection lens 9, blocks s-polarized light, and transmits p-polarized light. The s-polarized light corresponds to the first polarized light, and the p-polarized light corresponds to the second polarized light, as described above.

The polarization separator 5 includes the pair of light transmissive members 51 and the polarization separation layer 52.

The polarization separation layer 52 is provided between the pair of light transmissive members 51. The polarization separation layer 52 inclines with respect to the X-direction toward the negative end thereof and the Z-direction toward the positive end thereof. The X-direction toward the negative end thereof corresponds to the first direction, and the Z-direction toward the positive end thereof corresponds to the second direction.

The configuration described above can block the s-polarized light that enters the projection lens 9 from the polarization separator 5 even when the light transmissive members 51 are distorted. The decrease in the contrast of an image projected by the projection lens 9 can therefore be suppressed.

Variations of Embodiments

The present disclosure is not limited to the embodiments described above, and variations, improvements, and other modifications to the extent that the advantage of the present disclosure is achieved fall within the scope of the present disclosure.

It is assumed in the embodiments described above that the light source apparatus 2, which outputs the white light WL, includes the base member 21, the reflection layer 22, the solid-state light emitter 23, and the phosphor layer 24, but not necessarily. The configuration of the light source apparatus 2 is not limited to the configuration described above as long as the light source apparatus 2 can output the white light WL containing the white light WLs and the white light WLp. For example, the light source apparatus 2 may have a configuration including a solid-state light emitter that emits red light, a solid-state light emitter that emits green light, and a solid-state light emitter that emits blue light.

The light source apparatus 2 is not necessarily oriented so as to output the white light WL in the Z-direction toward the positive end thereof. The light source apparatus 2 may be oriented so as to output the white light WL in the X-direction toward the positive or negative end thereof as long as the light source apparatus 2 allows the white light WL to enter the polarization separator 5 in the Z-direction toward the positive end thereof, for example, with the aid of a reflection member provided on the optical path.

It is assumed in the embodiments described above that the projectors 1A and 1B each include the reflector 3 and the reflection element 8, but not necessarily. The projectors 1A and 1B may not each include at least one of the reflector 3 and the reflection element 8.

It is assumed in the second embodiment described above that the polarizer PE is provided in the optical path between the polarization separator 5 and the projection lens 9, but not necessarily. The polarizer PE may be provided at the image-light-exiting-side-end of the projection lens 9.

Summary of Present Disclosure

The present disclosure will be summarized below as additional remarks.

Additional Remark 1

A projector including a light source apparatus that outputs light containing first polarized white light and second polarized white light, a polarization separator that receives the white light incident from the light source apparatus, reflects the first polarized white light in a first direction, and transmits the second polarized white light in a second direction that intersects with the first direction, a reflective liquid crystal panel that receives first color light, second color light, and third color light contained in the first polarized white light reflected off the polarization separator and has first pixels that output first image light as a result of modulation of the first color light and being the second polarized light in the opposite direction of the first direction, second pixels that output second image light as a result of modulation of the second color light and being the second polarized light in the opposite direction of the first direction, and third pixels that output third image light as a result of modulation of the third color light and being the second polarized light in the opposite direction of the first direction, a reflective color filter including first filters that are provided in accordance with the first pixels, transmit the first color light, and reflect the second color light and the third color light, second filters that are provided in accordance with the second pixels, transmit the second color light, and reflect the first color light and the third color light, and third filters that are provided in accordance with the third pixels, transmit the third color light, and reflect the first color light and the second color light, and a projection lens that projects, out of the first image light, the first image light having passed through the polarization separator and being the second polarized light, projects, out of the second image light, the second image light having passed through the polarization separator and being the second polarized light, and projects, out of the third image light, the third image light having passed through the polarization separator and being the second polarized light.

According to the configuration described above, out of the white light output from the light source apparatus, the first polarized white light is reflected off the polarization separator in the first direction and enters the reflective color filter.

Out of the first polarized white light having entered the reflective color filter, the first color light having passed through the first filters is incident on the first pixels, the second color light having passed through the second filters is incident on the second pixels, and the third color light having passed through the third filters is incident on the third pixels. The three types of image light, which are color light modulated by the first to third pixels of the reflective liquid crystal panel, pass through the corresponding first to third filters, further pass through the polarization separator, and are projected by the projection lens.

In this process, the color light excluding the first color light having entered the first filters is reflected off the first filters, the color light excluding the second color light having entered the second filters is reflected off the second filters, and the color light excluding the third color light having entered the third filters is reflected off the third filters. Since the thus configured filters do not absorb light, heat generated by the reflective color filter can be suppressed. Transfer of the heat from the reflective color filter to the reflective liquid crystal panel can thus be suppressed, so that deterioration of the reflective liquid crystal panel can be suppressed, and a compact cooling mechanism can be employed as a cooling mechanism that cools the reflective color filter and the reflective liquid crystal panel.

In addition to the above, the polarization separator can be used as an optical element that selects the image light modulated by the reflective liquid crystal panel and causes the selected image light to enter the projection lens, so that there is no need to provide a polarizing plate between the reflective liquid crystal panel and the polarization separator. The optical path between the reflective liquid crystal panel and the projection lens can thus be shortened, so that the size of the projector can be reduced.

Thermal effects on the reflective liquid crystal panel can therefore be suppressed with the reduction in the size of the projector maintained.

Additional Remark 2

The projector described in the additional remark 1, in which the polarization separator reflects in the opposite direction of the second direction the first polarized light reflected off the first, second, and third filters and entering the polarization separator in the opposite direction of the first direction, and the light source apparatus includes a scattering section that scatters the first polarized light incident from the polarization separator and outputs the scattered light.

According to the configuration described above, the first polarized color light reflected off the first, second, and third filters travels in the opposite direction along the optical path from the light source apparatus to the reflective color filter and reaches the light source apparatus. The scattering section of the light source apparatus scatters and outputs the incident first polarized light, and therefore allows the first polarized white light to enter the first to third filters of the reflective color filter. The color light reflected off each of the filters of the reflective color filter can therefore be incident on the other filters and then incident on the corresponding pixels of the reflective liquid crystal panel. The amount of light used by the reflective liquid crystal panel to form the image light can therefore be increased, so that the brightness of an image to be projected can be increased.

Additional Remark 3

The projector described in the additional remark 2, which further includes a reflection element that reflects in the opposite direction of the second direction the second polarized light having passed through the polarization separator in the second direction, and in which the scattering section scatters the second polarized light having passed through the polarization separator in the opposite direction of the second direction and incident on the scattering section, and outputs the first polarized light and the second polarized light.

The configuration described above allows the second polarized light having been output from the light source apparatus and having passed through the polarization separator to return to the light source apparatus. Part of the second polarized light having entered the light source apparatus is scattered by and repeatedly reflected off or otherwise affected by the scattering section, and the polarization direction of the second polarized light is therefore so rotated that the second polarized light is converted into the first polarized light.

The second polarized white light having passed through the polarization separator in the second direction can therefore be recycled and enter the reflective color filter. The amount of light used by the reflective liquid crystal panel to form the image light can therefore be increased, so that the brightness of an image to be projected can be increased.

Additional Remark 4

The projector described in any one of the additional remarks 1 to 3, which includes a reflector that is disposed in the optical path between the light source apparatus and the polarization separator and reflects light incident on the reflector.

According to the configuration described above, the reflector can guide the light diffusively output from the light source apparatus to the polarization separator 5, so that light loss can be suppressed.

Additional Remark 5

The projector described in the additional remark 4, in which the reflector scatters the incident light and outputs the first polarized light and the second polarized light.

According to the configuration described above, the second polarized light having been output from the light source apparatus and having passed through the polarization separator is scattered by the reflector, so that the polarization direction of the second polarized light is rotated, and the second polarized light is hence converted into the first polarized light. The second polarized white light output from the light source apparatus can therefore be recycled and converted into the first polarized white light, which can then enter the reflective color filter. The amount of light used by the reflective liquid crystal panel to form the image light can therefore be increased, so that the brightness of an image to be projected can be increased.

Additional Remark 6

The projector described in any one of the additional remarks 1 to 5, which further includes a parallelizing lens that is disposed in the optical path between the light source apparatus and the polarization separator and parallelizes the light output from the light source apparatus, and in which the parallelizing lens is a Fresnel lens.

According to the configuration described above, employing a Fresnel lens as the parallelizing lens disposed in the optical path between the light source apparatus and the polarization separator allows the light incident from the light source apparatus on the polarization separator to be parallelized, and the optical path length between the light source apparatus and the polarization separator to be shortened. The size of the projector can therefore be reduced. In addition to the above, the weight of the parallelizing lens can be reduced as compared with a case where a plurality of lenses are employed as the parallelizing lens.

Additional Remark 7

The projector described in any one of the additional remarks 1 to 6, which further includes a polarizer that is disposed in the optical path between the polarization separator and the projection lens, blocks the first polarized light incident on the polarizer, and transmits the second polarized light incident on the polarizer, and in which the polarization separator includes a pair of light transmissive members, and a polarization separation film provided between the pair of light transmissive members and inclining with respect to the first and second directions.

When the light transmissive members of the polarization separator are made of a glass material, the light transmissive members are in some cases distorted when manufactured, or distorted in other cases due to heat according to the intensity of the incident light. Such distortion produces a phase difference, and part of the first polarized light passing through the light transmissive members is converted into the second polarized light, and part of the second polarized light is converted into the first polarized light.

For example, when part of the first polarized color light reflected off the reflective color filter is converted into second polarized light, the converted second polarized color light passes through the polarization separation layer in the opposite direction of the first direction and enters the projection lens.

On the other hand, when part of the second polarized image light output from the reflective liquid crystal panel is converted into the first polarized light due to the distortion of the light transmissive members, the converted first polarized image light is reflected off the polarization separation layer in the opposite direction of the second direction and enters the light source apparatus. Such image light becomes stray light and does not enter the projection lens, reducing the amount of image light that enters the projection lens, resulting in reduction in the contrast of an image to be projected.

When the projector includes the reflection element described above, and when part of the second polarized white light reflected off the reflective element is converted into first polarized white light due to the distortion of the light transmissive members, the converted first polarized light is reflected off the polarization separation layer in the opposite direction of the first direction and enters the projection lens, resulting in a decrease in the contrast of an image to be projected.

In contrast, according the configuration of the additional remark 7, entrance of the first polarized light into the projection lens is suppressed by the polarizer even when the light transmissive members are distorted, and the second polarized image light enters the projection lens. The decrease in the contrast of an image projected by the projection lens can therefore be suppressed.

What is claimed is:

1. A projector comprising:

a light source apparatus that outputs light containing first polarized white light and second polarized white light;

a polarization separator that receives the white light incident from the light source apparatus, reflects the first polarized white light in a first direction, and transmits the second polarized white light in a second direction that intersects with the first direction;

a reflective liquid crystal panel that receives first color light, second color light, and third color light contained in the first polarized white light reflected off the polarization separator and has first pixels that output first image light as a result of modulation of the first color light and being the second polarized light in an opposite direction of the first direction, second pixels that output second image light as a result of modulation of the second color light and being the second polarized light in the opposite direction of the first direction, and third pixels that output third image light as a result of modulation of the third color light and being the second polarized light in the opposite direction of the first direction;

a reflective color filter including first filters that are provided in accordance with the first pixels, transmit the first color light, and reflect the second color light and the third color light, second filters that are provided in accordance with the second pixels, transmit the second color light, and reflect the first color light and the third color light, and third filters that are provided in accordance with the third pixels, transmit the third color light, and reflect the first color light and the second color light; and a projection lens that projects, out of the first image light, the first image light passing through the polarization separator and being the second polarized light, projects, out of the second image light, the second image light passing through the polarization separator and being the second polarized light, and projects, out of the third image light, the third image light passing through the polarization separator and being the second polarized light, wherein the polarization separator reflects in an opposite direction of the second direction the first polarized light reflected off the first, second, and third filters and entering the polarization separator in the opposite direction of the first direction, and the light source apparatus includes a scattering section that scatters the first polarized light incident from the polarization separator and outputs the scattered light.

2. The projector according to claim 1, further comprising a reflection element that reflects in the opposite direction of the second direction the second polarized light passing through the polarization separator in the second direction, wherein the scattering section scatters the second polarized light passing through the polarization separator in the opposite direction of the second direction and incident on the scattering section, and outputs the first polarized light and the second polarized light.

3. The projector according to claim 1, further comprising a reflector that is disposed in an optical path between the light source apparatus and the polarization separator and reflects light incident on the reflector.

4. The projector according to claim 3, wherein the reflector scatters the incident light and outputs the first polarized light and the second polarized light.

5. The projector according to claim 1, further comprising a parallelizing lens that is disposed in the optical path between the light source apparatus and the polarization separator and parallelizes the light output from the light source apparatus, the parallelizing lens is a Fresnel lens.

6. The projector according to claim 1, further comprising a polarizer that is disposed in an optical path between the polarization separator and the projection lens, blocks the first polarized light incident on the polarizer, and transmits the second polarized light incident on the polarizer, wherein the polarization separator includes a pair of light transmissive members, and a polarization separation film provided between the pair of light transmissive members and inclining with respect to the first and second directions.

7. A projector comprising:

a light source apparatus that outputs light containing first polarized white light and second polarized white light;

a polarization separator that receives the white light incident from the light source apparatus, reflects the first polarized white light in a first direction, and transmits the second polarized white light in a second direction that intersects with the first direction;

a reflective liquid crystal panel that receives first color light, second color light, and third color light contained in the first polarized white light reflected off the polarization separator and has first pixels that output first image light as a result of modulation of the first color light and being the second polarized light in an opposite direction of the first direction, second pixels that output second image light as a result of modulation of the second color light and being the second polarized light in the opposite direction of the first direction, and third pixels that output third image light as a result of modulation of the third color light and being the second polarized light in the opposite direction of the first direction;

a reflective color filter including first filters that are provided in accordance with the first pixels, transmit the first color light, and reflect the second color light and the third color light, second filters that are provided in accordance with the second pixels, transmit the second color light, and reflect the first color light and the third color light, and third filters that are provided in accordance with the third pixels, transmit the third color light, and reflect the first color light and the second color light;

a projection lens that projects, out of the first image light, the first image light passing through the polarization separator and being the second polarized light, projects, out of the second image light, the second image light passing through the polarization separator and being the second polarized light, and projects, out of the third image light, the third image light passing through the polarization separator and being the second polarized light; and a polarizer that is disposed in an optical path between the polarization separator and the projection lens, blocks the first polarized light incident on the polarizer, and transmits the second polarized light incident on the polarizer, wherein the polarization separator includes a pair of light transmissive members, and a polarization separation film provided between the pair of light transmissive members and inclining with respect to the first and second directions.

* * * * *